United States Patent [19]

Yaegashi et al.

[11] 4,083,183
[45] Apr. 11, 1978

[54] INTERNAL COMBUSTION ENGINE FOR A VEHICLE

[75] Inventors: Takehisa Yaegashi; Takayoshi Nakatomi, both of Susono, Japan

[73] Assignee: Toyota Jidosha Kogyo Kabushiki Kaisha, Toyota, Japan

[21] Appl. No.: 723,281

[22] Filed: Sep. 14, 1976

[30] Foreign Application Priority Data

Dec. 17, 1975 Japan .................................. 50-149471

[51] Int. Cl.² .................... F02B 75/10; F02M 25/06
[52] U.S. Cl. ........................................ 60/290; 60/294; 123/124 B
[58] Field of Search ............... 60/285, 276, 289, 290, 60/294; 123/124 R, 124 B

[56] References Cited

U.S. PATENT DOCUMENTS

| | | | |
|---|---|---|---|
| 3,827,237 | 8/1974 | Linder | 60/289 |
| 3,906,723 | 9/1975 | Matumoto | 60/290 |
| 4,007,718 | 2/1977 | Laprade | 60/276 |

Primary Examiner—Douglas Hart
Attorney, Agent, or Firm—Stevens, Davis, Miller & Mosher

[57] ABSTRACT

An internal combustion engine provided with an EFI (electronic fuel injection) system, in which the ratio of the amount of air introduced into the engine intake system to the amount of fuel supplied to the combustion chamber is controlled to a predetermined constant ratio irrespective of engine operating conditions, is disclosed. A part of the introduced air is diverted from the intake pipe in accordance with the engine operating condition, and is introduced into the exhaust system or re-introduced into the intake system of the engine when the engine is operating under particular conditions. Thus, a rich air-fuel mixture, which is, for example, suitable for a particular engine operating condition, can be supplied to the engine combustion chamber.

4 Claims, 3 Drawing Figures

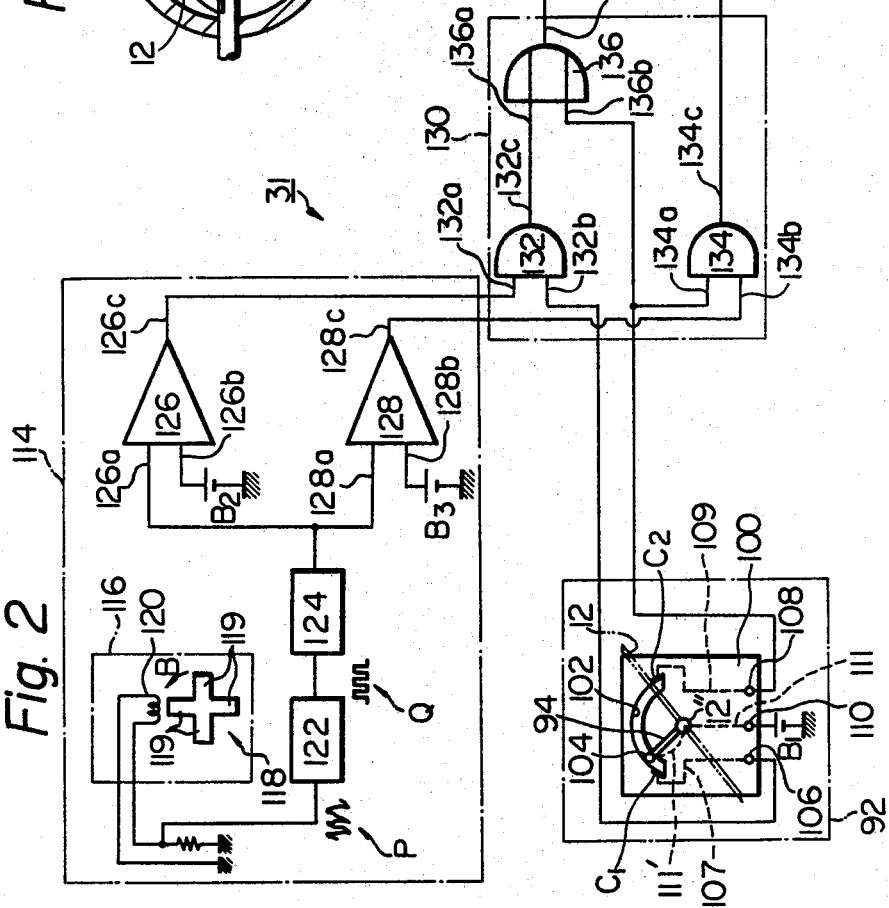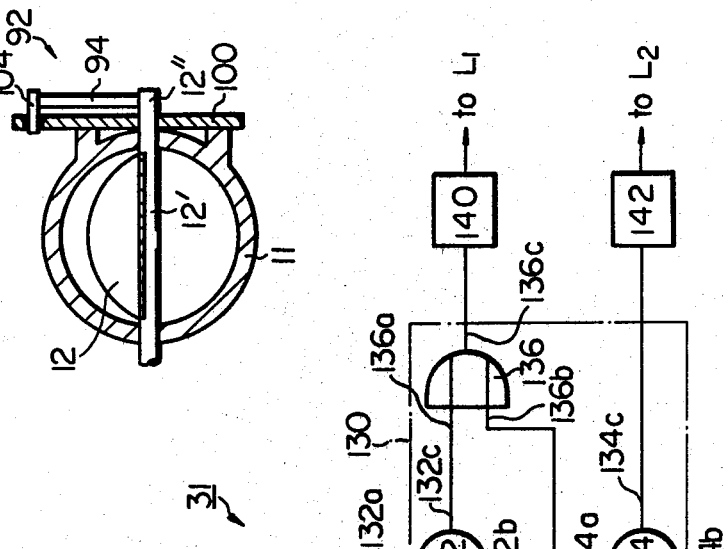

INTERNAL COMBUSTION ENGINE FOR A VEHICLE

FIELD OF THE INVENTION

The present invention relates to an internal combustion engine for a vehicle wherein the amount of fuel supplied to the engine is controlled in accordance with amount of air introduced into the engine intake system in order to keep a constant ratio of the amount of the introduced air to the amount of fuel.

BACKGROUND OF THE INVENTION

There has already been known a so called EFI (electronic fuel injection) type internal combustion engine which has a flow meter for sensing the amount of air introduced into an intake system of the engine. This engine also has a fuel injector for supplying an amount of fuel into the intake system in accordance with the amount of the introduced air in order to maintain a predetermined constant ratio of the amount of air to the amount of fuel. With this type of internal combustion engine an advantage is obtained in that a constant air-fuel ratio of the air-fuel mixture is supplied to the engine combustion chamber irrespective of the engine operating condition. For example, it is possible to keep the air-fuel ratio at an ideal ratio (about 14.0) for the engine, in order to obtain maximum output power and fuel efficiency. This feature of maintaining an ideal air-fuel ratio irrespective of engine operating condition is also advantageous if the engine is provided with catalytic converter in its exhaust system for suppressing toxic emissions from the engine. This is because a catalytic converter effectively eliminates toxic components in the exhaust gas only when the air-fuel ratio of the air-fuel mixture is controlled to be within a predetermined narrow range. For example, if a three way-catalytic converter is used, it is necessary to keep the air-fuel ratio at an ideal ratio for the engine, in order to obtain effective operation of the three-way catalytic converter.

However, it is often desired to supply an air-fuel mixture with an air-fuel ratio other than said ideal ratio when the engine is operating under a particular condition. For example, a rich air-fuel mixture stabilizes the engine idling operation. Further, to obtain a large output power during the time the engine is operating under high load conditions, a rich air-fuel mixture should be supplied to the engine.

SUMMARY OF THE INVENTION

An object of the invention is to provide an internal combustion engine of EFI type in which an air-fuel mixture of a suitable air-fuel ratio can be supplied according to each engine running condition.

Another object of the invention is to provide an internal combustion engine of EFI type, in which a rich air-fuel mixture can be supplied, when the engine is operating under a particular condition, by diverting a part of the intake air from the intake pipe to the engine intake system or exhaust system. Still another object of the present invention is provide the above mentioned type internal combustion engine in which a catalytic converter arranged in the exhaust system effectively operates to suppress toxic emission from the engine, while preventing the catalytic converter from being overheated.

According to the invention, an internal combustion engine for a vehicle is provided having a flow meter for sensing the amount of air introduced into an intake system of the engine and a fuel injector for supplying an amount of fuel into the engine intake system to maintain a predetermined constant ratio of the amount of air to the amount of fuel.

The engine comprises: first pipe means forming a diversion passageway connected to the intake system of the engine located downstream from said flow meter; a pump provided in the diversion passageway for diverting a part of said introduced air from the intake system of the engine; second pipe means forming re-introducing passageways, each of which is connected to a predetermined location of the engine passageway including the intake and exhaust system; valve means for switching communication between the diversion passageway and each of said re-introduction passageways, and; means for operating said switching operation of said valve means for re-introducing said diverted air into one of said locations of the engine through respective re-introducing passageways in accordance with engine operating conditions, whereby an air-fuel mixture of an air-fuel ratio which is suitable for each of said engine operating conditions is supplied to the engine combustion chamber.

BRIEF DESCRIPTION OF THE DRAWINGS

FIG. 2 shows a diagramatic view of an operating unit used in the internal combustion engine shown in the FIG. 1;

FIG. 3 shows a cross-sectional view of a throttle position sensor used in the operating unit shown in the FIG. 2.

DESCRIPTION OF THE PREFERRED EMBODIMENT

Figure 1:
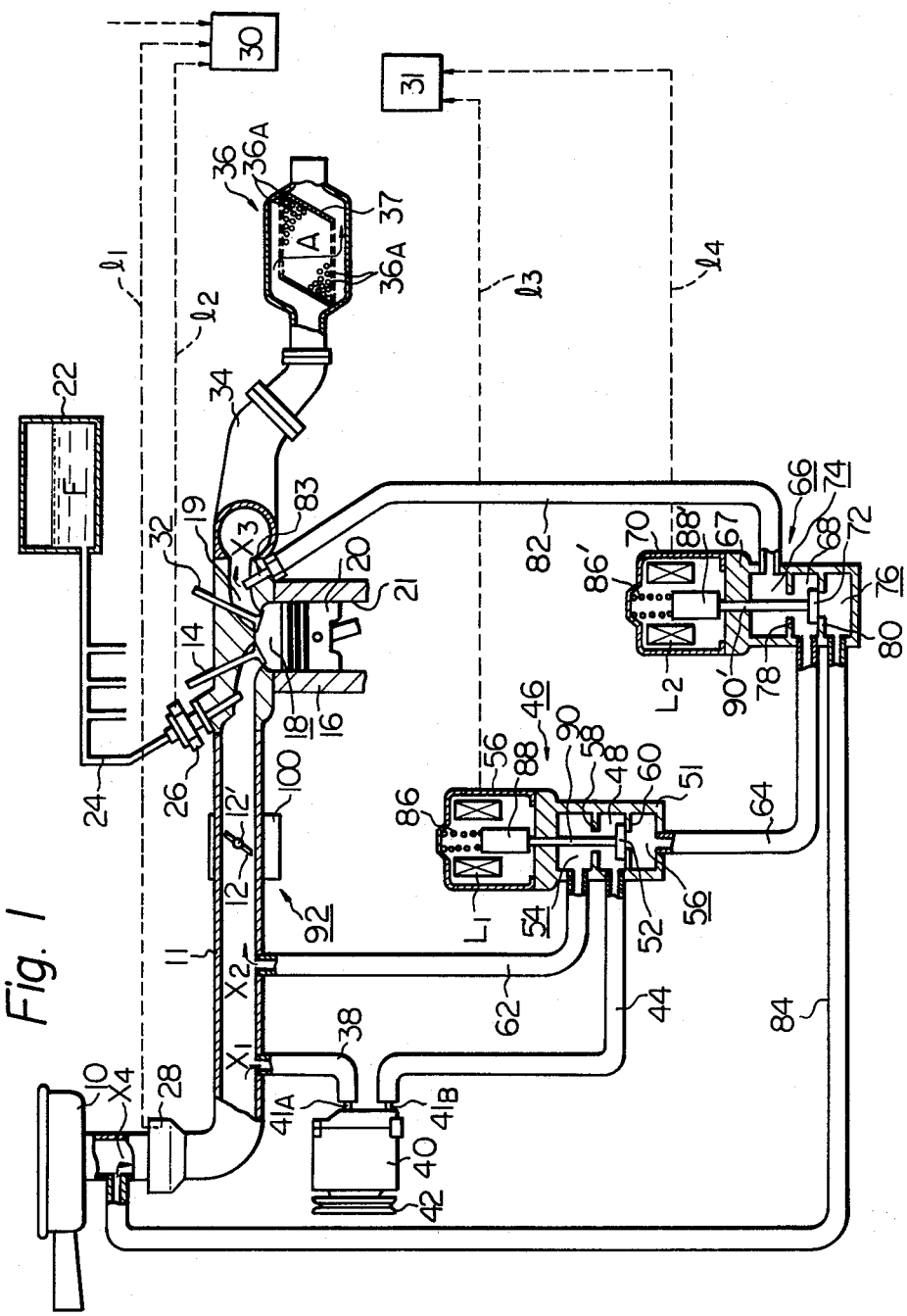
FIG. 1 shows a schematic view of an internal combustion engine of the fuel injection type according to the invention.

In FIG. 1, showing a cylinder of an internal combustion engine provided with so-called EFI (electronic fuel injection) system, the numeral 10 denotes an air cleaner adapted for introducing air into an air intake pipe 11 of the engine. The introduced air is supplied to the combustion chamber of each cylinder formed in an engine body 16, through an throttle valve 12 provided in the intake pipe 11 and through a intake valve 14. A piston 20 is reciprocatably accommodated in each cylinder bore 21.

Numeral 22 designates a fuel container. An amount of fuel F from the container 22 is supplied, through a respective fuel pipe 24 provided with a fuel injector valve 26, to each combustion chamber 18, causing the supplied fuel to be mixed with the introduced air. The fuel injector valve 26 is opened at a predetermined period of the operating cycle of each cylinder in such a manner that a predetermined amount of fuel F is supplied to the intake pipe 11 in accordance with the amount of intake air.

Downstream from the air cleaner 10 an air flow meter 28, connected to an electronic operating unit 30 by an electric line $l_1$, is provided for sensing the amount of introduced air, which amount depends on the throttle opening and engine rotation speed. The electronic unit 30 is also connected to the fuel injector 26 by an electric line $l_2$ for operating the fuel injector 26. The electronic unit 30 controls the operation time of the fuel injector 26 so that it supplies an amount of fuel to the intake pipe in accordance with a signal from the flow meter indicating the amount of air introduced into the intake system 11 from the air cleaner 10. This is done in such a manner that the air-fuel ratio (ratio of the amount of injected fuel to the amount of introduced air) is controlled so that it is near the ideal air-fuel ratio for the engine (about 14.0). Since the construction and the operation of the unit 30, which is utilized in the EFI system, is already known, a detailed description of the construction and operation of the unit 30 is omitted.

The air-fuel mixture, having a constant ideal air-fuel ratio for the engine, is directed to the combustion chamber 18 so that the mixture is burned in the chamber. The resultant combustion gas is introduced into an exhaust pipe 34 via an exhaust valve 32, and is directed to a three-way catalytic converter 36 which has an perforated casing 37 in which catalytic particles $36_A$ are packed. The exhaust gas is passed through catalytic particles $36_A$ as shown by an arrow A, which causes three toxic components ($NO_X$, CO and HC) in the exhaust gas to be eliminated.

As is clear from the above description, the above mentioned internal combustion engine, which has substantially the same construction as previously known engines, permits control of the air-fuel ratio of the air-fuel mixture supplied to the combustion chamber 18 so that it is near the ideal air-fuel ratio which is desirable not only for maximum output efficiency but also for the effective operation of the three-way catalytic converter 36.

However, it is not always desirable to control the air-fuel ratio so that it is near the ideal air-fuel ratio because it is often necessary to supply a rich air-fuel mixture to the engine when it is operating under a particular condition. According to the present invention, a part of the intake air from the air cleaner 10 is diverted from the intake pipe 11, between the flow meter 28 and the throttle valve 12, by a diversion pipe 38. The diversion operation is forcibly effected by an air pump 40 having an input port $41_A$ connected to an end of the pipe 38 and an output port $41_B$. The air pump 40 has a drive shaft provided with a pulley 42 connected to a crank shaft (not shown) of the engine via a V-belt (not shown). As the air pump 40, a so-called vane type pump may be utilized.

The output port $41_B$ is connected, through a diversion pipe 44, to a first flow direction switching valve 46 of the electro-magnetic type. The valve 46 has a body 51 provided with a first chamber 48, a second chamber 54 and a third chamber 56. The pipe 44, communicates the output $41_B$ of the air pump 40 with the first chamber 48 of the valve 46. The first flow direction switching valve 46 has a case 56 mounted on the body 51 and provided therein is a solenoid mechanism including a solenoid $L_1$ and a piece 88 made of permanent magnetic material. A valve member 52, which is connected to the piece 88 through a rod 90, is arranged between a first valve seat 58 and a second valve seat 60 which are formed in the body 51. The first chamber 48 communicates with the second chamber 54 or third chamber 56 in accordance with the position of the valve member 52, the operation of which will described hereinafter. The first switching valve 46 has two positions. In the first (OFF) position, in which the solenoid $L_1$ is not energized, the valve member 52 is rested on the second valve seat 60 under the force of a spring 86, so that the first chamber 48 communicates with the second chamber 54. In the second (ON) position, in which the solenoid $L_1$ is energized, the valve member 52 is rested on the first valve seat 58, against the force of the spring 86, by a magnetic force between the piece 88 and energized solenoid $L_1$.

The second chamber 54 of the first switching valve 46 is connected, through a first re-introduction pipe 62, to a location of the intake pipe 11 between the flow meter 28 and the throttle valve 12. The third chamber 56 of the valve 46 is connected to a second flow direction switching valve 66, via a intermediate pipe 64.

The second flow direction switching valve 66, which has substantially the same construction as the valve 46, includes a body 67 provided with a first chamber 68, a second chamber 74 and a third chamber 76. The first chamber 68 of the second flow direction valve 66 communicates with the third chamber 56 of the first flow direction valve 46, via the intermediate pipe 64. The second flow direction valve 66 has a case 70 mounted on the body 67 and provided therein is a solenoid mechanism including a solenoid coil $L_2$ and a piece 88' made of a permanent magnetic material. A valve member 72, which is connected to the piece 88' through a rod 90', is arranged between a first valve seat 78 and a second valve seat 80 which are formed in the body 67. The first chamber 68 communicates with the second chamber 74 or the third chamber 76 in accordance with the position of the valve member 72, the operation of which will described hereinafter. The second switching valve 66 has first and second positions. In the first (OFF) position, in which the solenoid $L_2$ is not energized, the valve member 72 is rested on the second valve seat 80 under the force of a spring 86', so that the first chamber 68 communicates with the second chamber 74. In the second (ON) position, in which the solenoid $L_2$ is energized, the valve member 72 is rested on the first valve seat 78, against the force of the spring 86', by a magnetic force between the piece 88' and the energized solenoid $L_2$.

The second chamber 74 of the second flow direction valve 66 is connected, through a second re-introduction pipe 82, to an air nozzle 83 mounted so as to protrude into an exhaust passageway 19 near the exhaust valve 32. The third chamber 76 is connected, through a third re-introduction pipe 84 to a location in the engine intake system between the air-cleaner and the flow meter 28.

The switching operation of the first and second flow direction valves 46 and 66 is carried out by another electronic control unit 31, the construction of which will be described hereinafter. The electronic control unit 31 is associated with the solenoid $L_1$ of the valve 46 and the solenoid $L_2$ of the valve 66, via electric line systems $l_3$ and $l_4$, respectively.

The unit 31 has, as shown in FIG. 2, a throttle position sensor 92. As shown in FIG. 3, the sensor 92 has a plate 100, made of electric insulation material, which is stationarily secured to the outer wall of the intake pipe 11 so that a pivot pin 12' of the throttle valve 12 is perpendicularly positoned with respect to the plane of the plate 100. One end 12" of the pivot pin 12' is rotatably supported on and extended out through the wall of the intake pipe 11, and is rotatably inserted to a hole formed in the plate 100. The plate 100 includes a slit 102 (FIG. 2) of an arcuate shape. A lever 94, made of electric insulating material, is at one end perpendicularly secured to the end 12" of the pivot pin 12. The lever 94 is, at the other end, secured to a slide contact 104 of a pin shape which is inserted into the arcuate slit 102, so that the contact 104 slides along the slit 102 when the throttle valve 12 is rotated about the pivot pin 12'. The slit 102 has, on the two ends thereof, a stationary contact $C_1$ and $C_2$, respectively. The contact $C_1$ is connected to a terminal 106 via a wire 107, while the contact $C_2$ is connected to a terminal 108 via a wire 109. The slide contact 104 is connected to a terminal 110 via wires 111 and 111'.

When the throttle valve 12 is rotated in a counter clockwise direction in FIG. 2 until the valve 12 is situated in its fully closed position, the slide contact 104 touches the contact $C_1$. As a result an electric current, indicating that the throttle valve 12 is fully closed, can be obtained between the terminals 106 and 110, if the battery $B_1$ is used as shown in FIG. 2. When the throttle valve 12 is rotated in a clockwise direction in FIG. 2 until the valve is situated in its fully opened position, the slide contact 104 touches the contact $C_2$. As a result, an electric current indicating that the throttle valve 12 is fully opened, can be obtained between the terminals 108 and 110 if the battery $B_1$ is used as shown in FIG. 2.

The electronic control unit 31 (FIG. 1) also includes an engine rotational speed sensor 114 (FIG. 2). The sensor 114 is adapted for providing an output pulse signal indicating that the rotational speed of the engine is lower than a predetermined speed near the idle rotational speed, and; an output pulse signal indicating that engine rotational speed is higher than a predetermined speed near the maximum rotational speed. The sensor 114 comprises an ignition pulse generation unit 116, which includes a rotary member 118 made of permanent magnet material of cross shape in the transverse cross-section. The rotary member 118 is an integral part of a cam shaft of the distributor (not shown) of the engine and, therefore, is mechanically connected to the crank shaft (not shown) of the engine. This allows the member 118 to be rotated in one direction, for example in a direction shown by an arrow B, in accordance with the rotation of the engine. A coil 120 is stationarily arranged near the cross shaped rotary member 118. As is clear from the arrangement of the unit 116, an electric pulse is induced in the coil 120 each time one of the ends 119 of the cross shaped rotary member 118 faces the coil 120 during the rotation of the member 118 in the direction of the arrow B. Therefore, a pulsating current as shown by p is induced in the coil 120, the frequency of which corresponds to the rotation of the member 118, in other words the rotation of the engine. The sensor 114 further includes: a monostable unit 122 connected to the coil 120 to transform the pulsating current p into a pulsating current as shown by Q, and; a frequency-voltage converter 124 for converting the frequency signal of the pulsating current Q, corresponding to the rotational speed of the engine into a voltage signal, also corresponding to the rotational speed of the engine. The sensor 114 also includes a pair of comparators 126 and 128. The comparator 126, which is adapted to produce an output pulse when the engine rotational speed is lower than a predetermined value $R_1$ near the idle rotational speed $R_i$, has two inputs 126a and 126b. The output of the converter 124 is connected to the input 126a. Connected to the input 126b is a battery $B_2$ for producing a voltage level corresponding to engine rotational speed $R_1$, slightly larger than the idle rotational speed $R_1$. The comparator 126 operates to provide an output pulse at the output 126c thereof when the voltage level at the input 126a is lower than the voltage level at the input 126b, in other words, when the engine rotational speed is lower than the rotational speed $R_1$, because the engine is idling. The comparator 128, which is adapted to provide an output pulse when the engine rotational speed is larger than a predetermined value $R_2$ near the maximum speed $R_m$ thereof, has two inputs 128a and 128b. The output of the converter 124 is connected to the input 128a. Connected to the input 128b is a battery $B_3$ for producing a voltage level corresponding to engine rotational speed $R_2$ slightly smaller than the engine maximum rotational speed $R_m$. The comparator 128 operates to provide an output pulse at the output 128c thereof when the voltage level at the input 128a is larger than the voltage level at the input 128b, in other words, when the engine rotational speed is larger than the rotational speed $R_2$, because the engine is operating at its maximum revolutions per minute.

As is clear from the construction of the sensor 114, an output pulse is obtained at the output 126c when the engine rotational speed is lower than $R_1$ near the idle rotational speed $R_i$, and; an output pulse is obtained at the output 128c when the engine rotational speed is larger than $R_2$ near maximum rotational speed $R_m$. When the engine rotation is between $R_1$ and $R_2$, no pulse is obtained.

The electric control circuit 114 further has a unit 130 to operate the switching of the electro-magnetic flow direction valves 46 and 66. The unit 130 has an AND gate 132 having two inputs 132a and 132b. The input 132a is connected to the output 126c of the comparator 126c of the rotational speed sensor 114. The input 132b is connected to the terminal 106 of the throttle position sensor 92. Another AND gate 134 is provided in the unit 130 and has two inputs 134a and 134b. The input 134a is connected to the terminal 108 of the throttle position sensor 92. The input 134b is connected to the output 128c of the comparator 128 of the rotational speed sensor 114. The gate 132 (or 134) operates to produce an output pulse at an output 132c (or 134c), when pulses are received at both inputs 132a and 132b (134a and 134b) thereof.

The unit 130 further includes an OR gate 136 having two inputs 136a and 136b. The input 136a is connected to the output 132c of the AND gate 132. The input 136b is connected to the input 134a of the AND gate 134a as well as the terminal 108 of the throttle position sensor 92. The OR gate 136 operates to produce an output signal at an output 136c thereof when at least one input signal is received at one of inputs 136a or 136b thereof.

The output 136c of the OR gate 136 is connected, through an amplifier unit 140, to the solenoid $L_1$ (FIG. 1) to drive and energize the valve 46. The output 134c of AND gate 134 is connected through another amplifier unit 142, to the solenoid $L_2$ (FIG. 1) to drive and energize the valve 66.

The operation of above-mentioned internal combustion engine, according to the invention, will not be described.

IDLE OPERATION

When the engine is idling, the throttle valve 12 is fully rotated in the counter clockwise direction in FIG. 1 to close the intake passageway in the pipe 11. As a result the slide contact 104 touches the stationary contact $C_1$ to provide a pulse which is supplied to the input 132b of the AND gate 132. In this idle operation, the voltage level at the input 126a of the comparator 126 is smaller than the voltage level at the input 126b, because the rotational speed of the rotary member 118 corresponds to the engine idle rotational speed. Therefore a pulse, which is supplied to the input 132b of the AND gate 132, is provided. Then, the AND gate 132 produce an output pulse which is supplied to the input 136a of the OR gate 136. Thus, an output pulse is obtained at the output 136c and is supplied, through the amplifier unit 140, to the solenoid $L_1$ of the electro-magnetic flow direction valve 46, in order to energize the solenoid $L_1$. As a result, the valve 46 is switched into the ON position by the electro-magnetic force between the solenoid $L_1$ and the piece 88, in which position the valve member 52 is rested on the valve seat 58, against the force of the spring 88, in order to communicate the chamber 48 with the chamber 56.

In this idle operation no pulse is received at the inputs of the AND gate 134 and, thus, no output pulse is produced at the output 134c. Therefore, the solenoid $L_2$ of the second electro-magnetic flow direction valve 66 is not energized, so that it is kept in its OFF position in which the valve member 72 rests the valve seat 80 under the force of the spring 86', in order to communicate the chamber 68 with the chamber 74.

As a result of the switching operation of the valves 46 and 66, a part of the intake air, which is diverted from the intake pipe 11 as shown by an arrow $X_1$ into the pipe 38 by the pump 40 which is driven by the engine crank shaft, is introduced into the chamber 48 of the valve 46 through the pipe 44. The thus introduced air is introduced into the chamber 56 of the valve 46 through the opened valve seat 60 and is introduced into the chamber 68 of the second flow direction valve 66 through the intermediate pipe 64. The air, which is introduced into the chamber 68, is introduced into the chamber 74 of the valve 66 and is re-introduced into the exhaust passage 19, as shown by an arrow $X_3$ (FIG. 1), through the pipe 82 and the nozzle 83.

Since a part of the intake air is diverted into the intake pipe 38, as shown by the arrow $X_1$, while the amount of fuel is controlled so that the ratio of the amount of intake air to the amount of fuel is kept at a predetermined constant ideal ratio by the "EFI" system, a rich air-fuel mixture is actually supplied to the engine combustion chamber 18, causing the idle operation to be stablized. The diverted air is introduced into the exhaust passage 19 via the nozzle 83 as shown by the arrow $X_3$, so that HC and CO components in the resultant exhaust gas are cleaned by said introduced air in the catalytic converter 36, due to the fact that the temperature of the exhaust is sufficiently increased at the place of the catalytic converter 36 so as to allow the HC and CO components to be oxidized by said introduced air.

LOW OR MIDDLE LOAD OPERATION

When the engine is operating under a low or middle load, the throttle valve 12 is opened so that the slide contact 104 locates in the guide slit 102 between the stationary contacts $C_1$ and $C_2$, in other words, the slide contact 104 does not touch either the contact $C_1$ or the contact $C_2$. Therefore, a pulse is not obtained at either terminal 106 or 108 of the throttle position sensor 92, and the AND gate 132 connected to the terminal 106 does not provide an output pulse to be supplied to the input 136a of the OR gate 136. In this case, at the input 136b of the OR gate 136, there is not output from the terminal 108 of the throttle position sensor 92 and, thus, the OR gate 136 does not provide a pulse at the output 136c. Therefore, the solenoid $L_1$ of the valve 46 connected, through the amplifier 140, to the output 136c is not energized to cause the valve 46 to be switched to the position in which the valve member 52 is rested on the valve seat 58. As a result of this, a part of the air which is diverted from the intake pipe 11 as shown by an arrow $X_1$ due to the rotation of the pump 40, is introduced into the chamber 48 of the first flow direction valve 46 through the pipe 44. The air is then introduced into the chamber 54 through the valve seat 58 and is re-introduced into the intake pipe 11 as shown by an arrow $X_2$, via the pipe 62.

Therefore in this low or mid load operation, the diversion operation of the intake air is cancelled and, thus, an air-fuel mixture of the predetermined ideal ratio is supplied to the combustion chamber due to the operation of the EFI system. Therefore, maximum fuel consumption efficiency is achieved, and the three way catalytic converter 36 effectively eliminates the three major toxic component in the resultant exhaust gas.

HEAVY LOAD OPERATION AT A RELATIVELY LOW ROTATIONAL SPEED

When the engine is operating under a heavy load, the throttle valve 12 is fully rotated in the clockwise direction of FIG. 2, so that the slide contact 104 touches the stationary contact $C_2$. This provides an output signal which is supplied to the input 136b of the OR gate 136 (and to the input 134a of the AND gate 134). Thus, the OR gate provides an output pulse at the output 136c, which is supplied through the amplifier 140 to the solenoid $L_1$ of the first flow direction valve 46 to energize the solenoid $L_1$. Therefore, the valve 46 is switched to the position in which the valve member 52 is rested on the valve seat 58.

In this heavy load operation, when the engine rotational speed is less than the maximum rotational speed of the engine, the output voltage level at the input 128a of the comparator 128 of the engine speed sensor 114 is smaller than the voltage level at the input 128b produced by the battery $B_3$. This is because the rotational speed of rotary member 118, connected to the engine crank shaft, is relatively slow. Therefore, a pulse is not obtained at the output 128c of the comparator 128, which is connected to the input 134b of the AND gate 134, and no pulse is produced at the output 134c. Thus, the solenoid $L_2$, which is connected to the output 134c, is prevented from being energized and the valve member 72 of the second flow direction valve 66 is kept against the seat 80 by the force of the spring 86'.

As a result of the switching operation of the valves 46 and 66, a part of the intake air, which is diverted from the intake pipe as shown by the arrow $X_1$, is introduced into the chamber 48 of the valve 46 via the pipes 38 and 44. The thus introduced air is introduced into the chamber 56 through the opened seat 60. The air is then introduced into the chamber 68 of the second flow direction valve via the intermediate pipe 64 and into the chamber 74 through the seat 78. The air in the chamber 74 is introduced into the exhaust passage 19 as shown by the arrow $X_3$.

As a result of the diversion of the intake air, an air-fuel mixture of a rich air-fuel ratio is actually supplied to the engine combustion chamber 18 as was already described under the heading in Idle Operation, above. Therefore, a large output power is obtained for effective high load operation. Since the diverted air is introduced into the exhaust passage as shown by the arrow $X_3$, the HC and CO components remaining in the resultant exhaust gas can be cleaned by the diverted air in the catalytic converter 36.

HEAVY LOAD OPERATION AT A RELATIVELY HIGH ROTATIONAL SPEED

When the engine rotational speed is increased under a heavy load from a relatively low speed, as described above, to the point where it is near the maximum rotational speed of the engine, the output voltage level at the input 128a of the comparator 128 of the sensor 114 exceeds the voltage level at the input 128b produced by the battery $B_3$. As a result, the comparator 128 produces a pulse at the output 128c which is supplied to the input 134b of the AND gate 134 and, therefore, the AND gate 134 produces a pulse at the output 134c. This pulse is supplied through the amplifier 142 to the solenoid $L_2$ of the second flow direction valve 66, in order to energize the solenoid. This causes the valve 66 to be switched to the position in which the valve member 72 is rested on the valve seat 78 and the valve seat 80 is open.

By the above described switching of the second flow directional valve 66 the diverted air is now directed to the chamber 76, and is prevented from being introduced into the chamber 74, in other words, into the exhaust system of the engine as shown by the arrow $X_3$. If, in this heavy load operation at a high rotational speed, the diverted air is introduced into the exhaust system through the chamber 74, the pipe 82 and the nozzle 83 as in the previously mentioned heavy load operation at a relatively low rotational speed, catalytic converter 36 will be overheated by the introduced air. This is because the temperature of the exhaust gas in this heavy load operation at a high rotational speed is extremely high, so that too intense an oxidization process takes place in the catalytic converter 36 by the diverted air introduced as shown by the arrow $X_3$, into the exhaust system. In this heavy load operation at high rotational speed, therefore, the air introduced into the chamber 76 is re-introduced into the intake pipe 11 between the air cleaner 10 and the flow meter 28, as shown by an arrow $X_4$, via the pipe 84.

In the above description only one embodiment is explained with reference to the drawings. However various modification can be readily anticipated by those who are skilled in this art without departing from the scope of the present invention.

What is claimed is:

1. An internal combustion engine for a vehicle comprising:
   an engine;
   an intake system connected to said engine;
   first means coupled to said intake system for sensing the amount of air introduced into the intake system of the engine;
   second means for supplying an amount of fuel into the engine intake system in accordance with the amount of introduced air sensed by said first means in order to maintain a predetermined constant air-fuel ratio;
   an exhaust system connected to said engine for receiving a resultant exhaust gas therefrom;
   first pipe means forming a diversion passageway connected to the intake system located downstream from said first means;
   pump means provided in said diversion passageway for forcibly diverting a part of said introduced air from said intake system of the engine;
   a first re-introduction passageway connected to said intake system located downstream from said first means;
   a second re-introduction passageway connected to said exhaust system;
   a third re-introduction passageway connected to the intake system upstream from said first means;
   valve means adapted for connecting the diversion passageway with one of said first, second or third re-introduction passageways;
   sensing means for providing control signals indicating operating conditions of the engine; and,
   means responsive to said control signals from said sensing means for operating said valve means to selectively couple said diversion passageway with one of said re-introduction passageways so that said diverted air is re-introduced into the engine through respective re-introducing passageways in accordance with engine operating conditions, whereby an air-fuel mixture of an air-fuel ratio which is suitable for each of said engine operating conditions is supplied to said engine.

2. An internal combustion engine according to claim 1 further comprising:
   a catalytic converter disposed in said exhaust system, said second re-introduction passageway being connected to said exhaust system upstream from said catalytic converter.

3. An internal combustion engine according to claim 2, wherein said valve means comprises:
   a first switching valve having a first and a second position, said first position coupling the diversion passageway with the first re-introduction passageway, said second position coupling the diversion passageway with an intermediate pipe; and,
   a second switching valve having a first and second position, said first position coupling the intermediate pipe with the second re-introduction passageway, said second position coupling the intermediate pipe with the third re-introduction passageway, said means for selectively coupling being adapted for switching valves between said respective first and second positions in accordance with said signals from said sensing means.

4. An internal combustion engine according to claim 3, wherein said sensing means comprises:
   a throttle position sensor providing a first signal indicating that a throttle valve is fully closed and a second signal indicating that the throttle valve is fully opened,
   an engine rotational speed sensor for providing a third signal indicating that the engine rotational speed is lower than a predetermined level of rotational speed near the engine's idle operation, and a fourth signal indicating that the engine rotational speed is higher than another predetermined level of rotation speed near the engine's maximum rotational speed,
   means responsive to said first, second, third, and fourth signals for generating a first, second, third and fourth set of signals indicating respectively that the engine is an idle operation, low and mid load operation, high load operation at a relatively low engine rotational speed, and high load operation at a relatively high engine rotational speed, and
   wherein said means for selectively coupling is adapted to operate the first and second switching valves in accordance with said sets of electric signals in such a manner that when the engine is in an idle operation the first switching valve is switched to its second position and the second switching valve is kept in its first position by said first set of electric signals in order to introduce the diverted air into the exhaust system through the second re-introduction passageway for supplying a rich air-fuel mixture to the engine combustion chamber, causing stabilization of the idle operation;

when the engine is in a low and mid load operation, the first switching valve is switched to its first position and the second valve is kept in its first position by said second set of signals in order to re-introduce the diverted air into the intake system through the first re-introduction passageway for supplying an air-fuel mixture of said predetermined air-fuel ratio to the engine combustion chamber;

when the engine is in a high load operation at a relatively low rotational speed, the first valve is switched to its second position and the second valve is kept in its first position by said third set of electric signals, in order to introduce the diverted air into the exhaust system through the second re-introduction passageway for supplying a rich air-fuel mixture to the combustion chamber for maximum output power of the engine while preventing a toxic component from being exhausted by the introduction of air through the second passageway; and when the engine is in a high load operation at a relatively high rotational speed, the first valve is switched to its second position and the second valve is switched to its second position by said fourth set of signals in order to re-introduce the diverted air into the intake system through the third re-introduction passageway to supply a rich air-fuel mixture to the engine combustion chamber for an effective high load operation while preventing the catalytic converter from being overheated.

* * * * *